May 7, 1963 W. A. EISENHAUER 3,088,228
PLANETARIUM
Filed Nov. 9, 1959 4 Sheets-Sheet 1
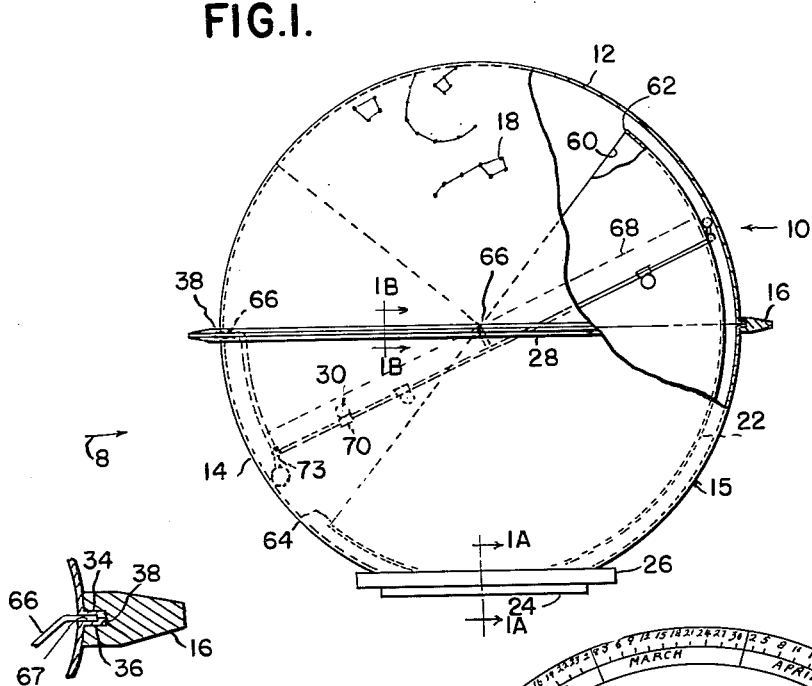
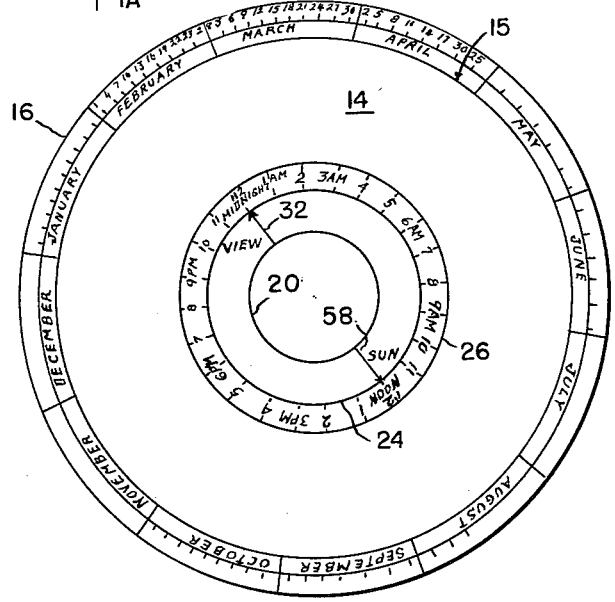
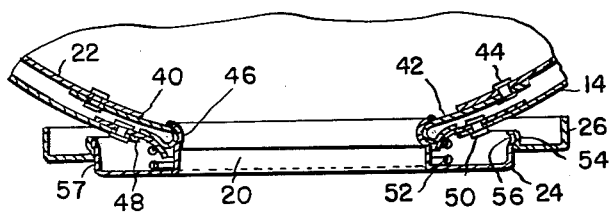
INVENTOR.
WILLIAM A. EISENHAUER
BY Whittemore
Halbert & Belknap
ATTORNEYS May 7, 1963 W. A. EISENHAUER 3,088,228
PLANETARIUM
Filed Nov. 9, 1959 4 Sheets-Sheet 2

INVENTOR.
WILLIAM A. EISENHAUER
BY Whittemore
Hulbert & Belknap
ATTORNEYS

May 7, 1963 W. A. EISENHAUER 3,088,228
PLANETARIUM
Filed Nov. 9, 1959 4 Sheets-Sheet 3

INVENTOR.
WILLIAM A. EISENHAUER
BY Whittemore
Halbert & Belknap
ATTORNEYS

May 7, 1963 W. A. EISENHAUER 3,088,228
PLANETARIUM
Filed Nov. 9, 1959 4 Sheets-Sheet 4

INVENTOR.
WILLIAM A. EISENHAUER
BY Whittemore
Hulbert & Belknap
ATTORNEYS

United States Patent Office 3,088,228
Patented May 7, 1963

3,088,228
PLANETARIUM
William A. Eisenhauer, Van Wert, Ohio, assignor to The Eisenhauer Manufacturing Company, Van Wert, Ohio, a co-partnership
Filed Nov. 9, 1959, Ser. No. 851,648
25 Claims. (Cl. 35—45)

The invention relates to planetariums and refers more particularly to a star scope for the visual representation of celestial bodies as they would appear at a selectable time and date.

With the growing interest in celestial bodies due to man's apparent imminent conquest of outer space the demand for devices from which knowledge of the location of the celestial bodies may be obtained has also grown. This is particularly true of devices which permit study of the relative location of the various celestial bodies such as the stars, planets and the moon without the necessity of actual observation thereof. At present such devices are however mainly limited to flat pictures of the celestial bodies for comparison with the actual position thereof in the sky and those which project images representative of the celestial bodies on the inner surface of an enclosure such as a dome shaped room in which the observer is positioned. The former have the disadvantage of appearing as only a picture and requiring a clear night and late hours for comparison with the actual celestial bodies in the sky. The latter are usually relatively expensive and require a special darkened enclosure of the dome type if distortion of the projected bodies is to be avoided.

Celestial globes are also available for viewing the relative positions of the stars. Such globes are relatively expensive and when the constellations are indicated on the outside of a solid sphere, then the configurations must necessarily be in reverse. When the constellations are indicated on a transparent sphere to correct this fault then the observer must peer through the opposite side which carries its own star indications causing objectionable interference. Interference is further compounded by the use of inner terrestrial spheres in most cases.

Also it should be noted that less expensive portable planetariums using the walls and ceiling of a darkened room as a celestial sphere on which to project star indications introduce distortion on the viewing surfaces of the flat walls and ceilings when a relatively expensive portable dome is not employed.

Therefore it is the purpose of the present invention to provide means for allowing study of the relative position of celestial bodies which requires no special enclosure on which representations of the bodies are projected and which presents a substantially undistorted representation of the celestial bodies.

Another purpose is to provide means for allowing study of the relative position of celestial bodies as they appear on a celestial sphere at any date which means is adapted for use in a lighted room at any time of day.

More specifically it is a purpose to provide an enclosure having indicia on the interior thereof which are positioned and sized to present a representation of the celestial bodies on the inner surface of said enclosure and means for observing the inner surface of said enclosure from the exterior thereof.

Still more specifically it is a purpose to provide an enclosure of the character described including a mask positioned with respect to said enclosure to allow observation of the indicia of only those celestial bodies which would be visible to an observer at a particular latitude on the earth on a certain date at a determined time of day.

Another purpose is to provide an enclosure of the character described wherein said mask is located interiorly with respect to said enclosure including means for adjusting the mask to allow observation of the representation of the celestial bodies visible on any selected day at any selected hour.

Another purpose is to provide an enclosure of the character described including a time meridian which is movable with said mask for use as a reference in locating the position of the indicia of particular celestial bodies on said sphere.

Another purpose is to provide an enclosure of the character described including special means for representing the moon and planets in their relative positions with respect to the other celestial bodies.

Another purpose is to provide an enclosure of the character described wherein said mask is located exteriorly of said enclosure.

Another purpose is to provide a star scope of the character described wherein the celestial bodies visible from a particular latitude at any time are represented by openings in a spherical surface entirely on one side of the star scope and the means allowing observance of the interior surface of the star scope is positioned on the other side thereof.

Another purpose is to provide a funnel shaped star scope of the character described wherein the celestial bodies are represented by openings in a flat surface or semi-hemispherical surface having flat peripheral portions which surfaces are positioned at the larger end of the star scope and means for viewing said openings is provided at the smaller end thereof.

These and other objects and features of the invention will become apparent as the description proceeds, especially when taken in conjunction with the accompanying drawings, illustrating preferred embodiments of the invention, wherein:

FIGURE 1 is an elevation view partly broken away of the star scope of the invention.

FIGURE 1-A is an enlarged sectional view of a portion of the star scope of FIGURE 1 taken on the line 1-A—1-A in FIGURE 1.

FIGURE 1-B is an enlarged sectional view of a portion of the star scope of FIGURE 1 taken on the line 1-B—1-B in FIGURE 1.

FIGURE 2 is a bottom view of the star scope of FIGURE 1.

Figure 4A:
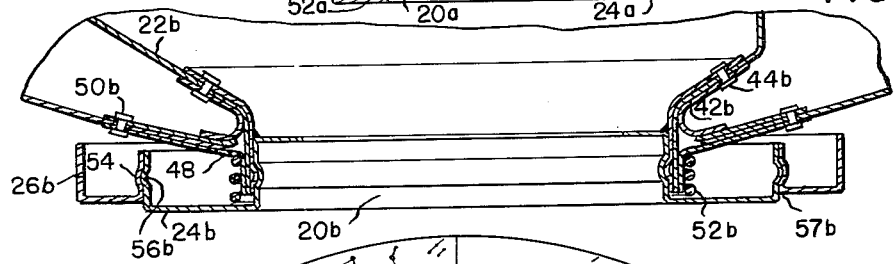
FIGURE 4 is an elevation view of another modification of the star scope of the invention having all of the celestial bodies visible at a particular latitude arranged on one side of the celestial sphere.
Figure 4:
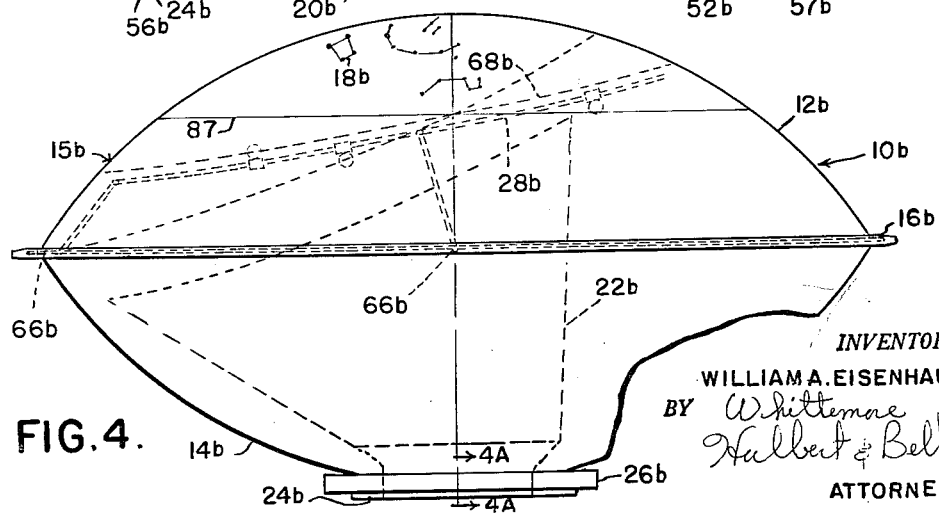

FIGURE 4-A is an enlarged sectional view of a portion of the star scope of FIGURE 4 taken on the line 4-A—4-A in FIGURE 4.

Figure 5:
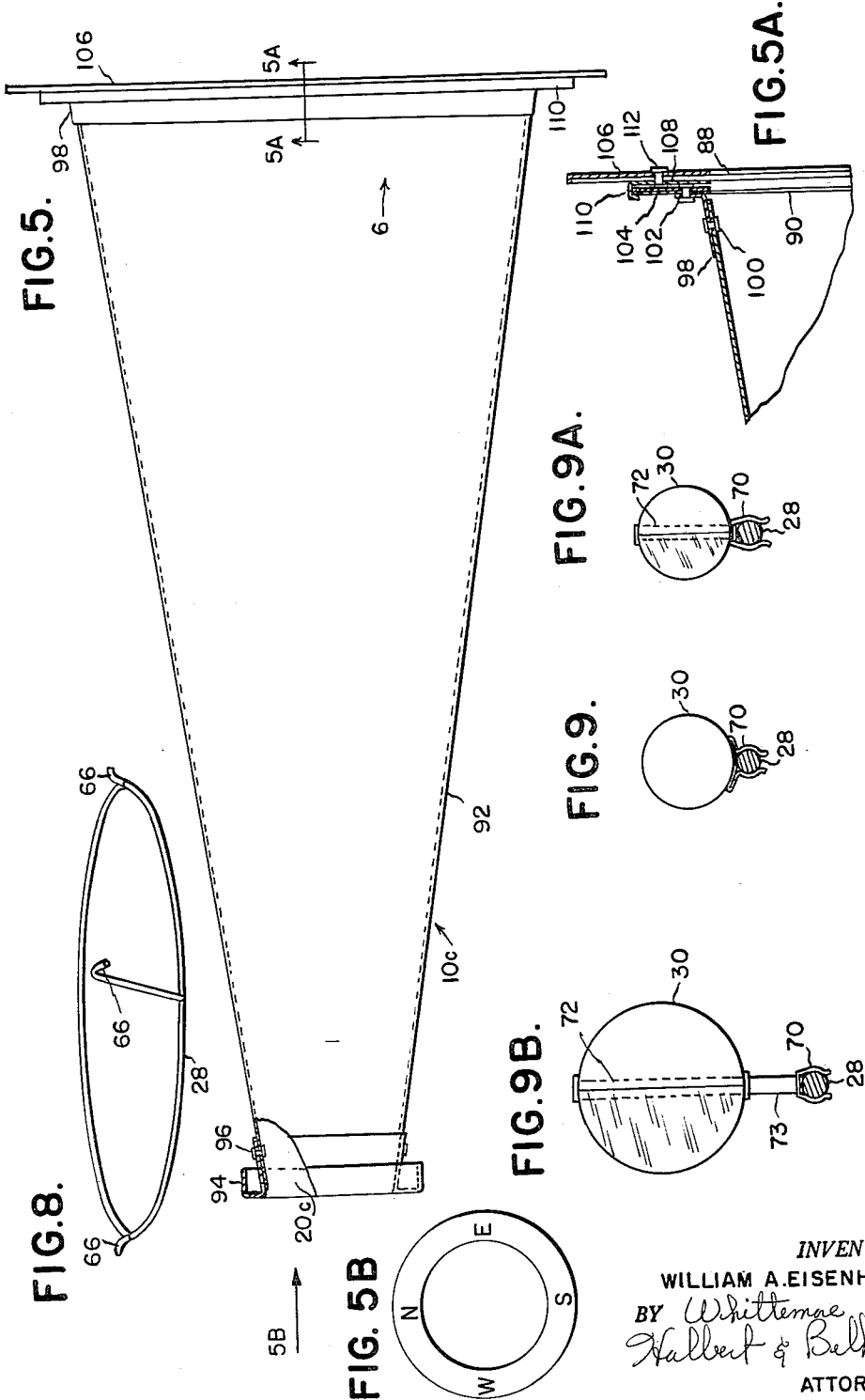

FIGURE 5 is a partly broken away elevational view of a modification of the star scope of the invention wherein the celestial bodies are represented on a flat disc.

FIGURE 5-A is an enlarged sectional view of a portion of the star scope of FIGURE 5 taken on the line 5-A—5-A in FIGURE 5.

FIGURE 5-B is a partial left end view of the star scope of FIGURE 5 taken in the direction of arrow 5-B in FIGURE 5.

Figure 6:
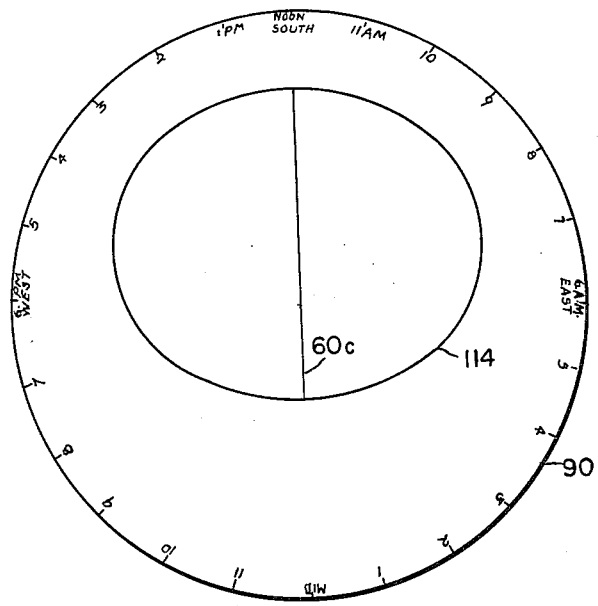

FIGURE 6 is a view of the hour dial indicator and horizon mask of the modification of FIGURE 5 taken in the direction of arrow 6 in FIGURE 5.

Figure 7:
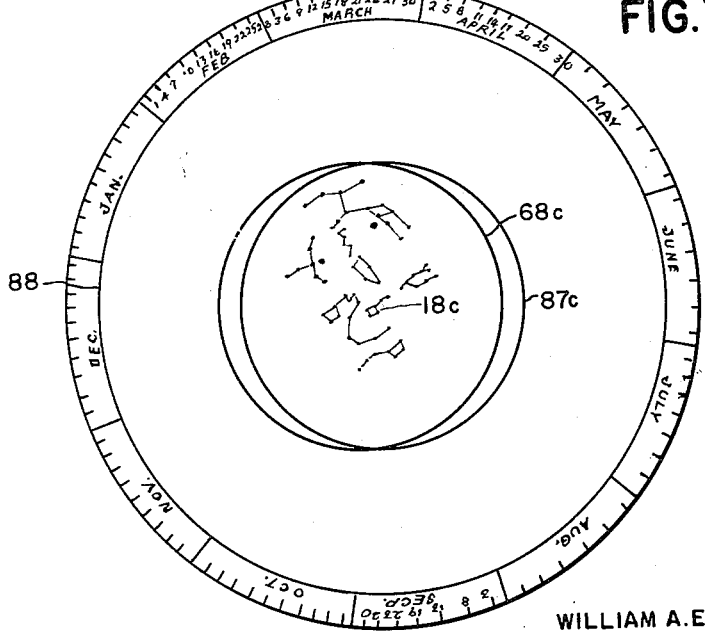

FIGURE 7 is a view of the date dial selector and star disc of the modification of FIGURE 5 taken in the direction of arrow 6 in FIGURE 5.

FIGURE 8 is a view of a planet pathway wire shown attached to the star scope of FIGURE 1 taken in the direction of arrow 8 in FIGURE 1.

FIGURES 9, 9-A and 9-B are elevational views of the planet pathway wire in FIGURE 1.

With particular reference to the drawings a specific embodiment of the star scope of the invention will now be described.

With reference to FIGURES 1 and 2 there is shown a star scope generally indicated 10 comprising a pair of hemispheres 12 and 14 which are connected together into a complete sphere 15 by means of a date ring 16. The sphere 15 formed by the hemispheres 12 and 14 has openings 18 provided therein in the position in which one would normally find celestial bodies such as stars on a celestial sphere. In addition the hemisphere 14 is provided with an opening 20 therein through which the interior surface of the celestial sphere 15 may be viewed.

A mask 22 of hemispherical construction is provided within the celestial sphere 15 and is capable of being positioned to prevent viewing of particular ones of the celestial bodies which are below the normal horizon line when the sky is viewed by an observer at a particular latitude. Also, a date dial selector 24 and an hour dial indicator 26 concentric with each other and with the opening 20 in the hemisphere 14 are provided in conjunction with the star scope 10 so that the mask 22 may be selectively positioned to allow viewing of a representation of the celestial bodies visible in the sky at any particular time on a selected date. A planet pathway wire 28 is positioned within the celestial sphere 15 as shown in FIGURE 1 and provides means for mounting planet representations 30 therein.

In operation, a particular date and time at which it is desired to view the celestial bodies is selected. The date dial selector 24 is then rotated with respect to the date ring 16 so that the sun arrow on the date dial selector 24 as shown in FIGURE 2 is in line with the selected date on the date ring 16. After the date dial selector 24 has indicated the midnight position of the sky at arrow 32 for the sun indicator date selected, then the hour dial indicator 26 is rotated to bring the hour time of midnight thereon into a position of alignment with view arrow 32 for the date selected. The hour dial indicator is then held stationary with respect to the celestial sphere 15 while the date dial selector and mask 22 which is attached thereto are rotated until the view arrow 32 on the date dial selector aligns with the selected time as represented on the hour dial indicator. When so positioned the mask 22 will allow an observer looking through opening 20 at the inner surface of the sphere 15 to view a representation of the celestial bodies as they would appear on the particular date and at the particular time selected.

More specifically the celestial sphere 15 as shown best in FIGURE 1 is formed of two hemispheres 12 and 14 which have outwardly projecting annular flanges 34 and 36 respectively around the outer edges thereof and an annular date ring 16 having a circumferential slot 38 in the inner surface thereof adapted to receive the flanges 34 and 36 to hold the hemispheres 12 and 14 in position in the form of a complete sphere as shown in FIGURE 1.

As previously mentioned the hemispheres 12 and 14 have openings 18 therein which are located in the same position as and are of the same relative size with respect to each other as celestial bodies such as stars would be on a celestial sphere. Illuminized markings may also be used to represent the celestial bodies or a combination of openings and illuminized markings such as 18 may be used.

The date ring 16 is provided with indications around the circumference thereof as shown best in FIGURE 2 which represent the months of a year and the day divisions thereof. As indicated in FIGURE 2 the indications on the date ring 16 are on the side thereof facing the hemisphere 14 and opening 20.

Celestial sphere 15 may be formed of plastic, metal or other material which is easily formable in the shapes shown, which is not easily breakable, may be perforated to provide star indications and is substantially opaque. The equator date ring may be of plastic or other material which may be easily formed in the shape shown and to which the date indications may be applied.

Mask 22 as illustrated is a substantially hemispherical member which is concentric and located interiorly with respect to the celestial sphere 15. Mask 22 is provided with an opening 40 which is substantially concentric with the opening 20 in the sphere 15. Mask 22 is mounted in opening 20 by means of ring 42 attached thereto around the opening 40 by convenient means such as rivets 44, which ring engages and is soldered to lip 46 on date dial selector 24 and ring 48 attached to the celestial sphere 15 around opening 20 by convenient means such as rivets 50 in conjunction with compression spring 52 as shown best in FIGURE 1-A. The mask 22 may be modified to determine the horizon of an observer on the earth's surface at any desired latitude. The particular mask 22 illustrated in FIGURE 1 is adapted to provide a horizon for an observer who is on the earth's surface at approximately forty degrees north latitude. The location of the horizon of course will determine what portion of the sky an observer will view at any particular time.

It will be noted that as the mask 22 is rotated with the date dial selector 24, changing representations of the celestial bodies will be presented on the inner surface of the celestial sphere 15 to a viewer peering through opening 20 as will subsequently become clear. The changing representation of the celestial bodies which may be observed as mask 22 is rotated through three hundred and sixty degrees will be the same as that presented to an observer of the sky located at forty degrees north latitude as the earth rotates through a full rotation which is equivalent in time to one full day based on a particular date and is equivalent to one full year based on a yearly scale.

The hour dial indicator 26 as illustrated is in the form of an annular channel concentric with the date dial selector 24 and rotatably positioned thereon by means of the annular groove 54 on the interior flange of the channel 26 as shown in conjunction with the mating annular groove 56 on the exterior wall 57 of the date dial selector 24. As shown best in FIGURE 2 the hour dial indicator 26 is provided with time indications of the hours of the day extending completely around the circumference thereof. In operation the time indications on the hour dial indicator 26 are used in conjunction with view arrow 32 and sun arrow 58 on the date dial selector 24 to position the mask 22 so that mask 22 will allow correct celestial bodies to be observed through the opening 20 to correspond with a particular time of day at which it is desired to observe the celestial bodies as will subsequently be more fully explained.

The date dial selector 24 as shown is rigidly attached to the ring 42 secured to mask 22 and is held in an outward position with respect to the sphere 15 by means of the compression spring 52 as previously indicated. Thus formed as shown and attached to the mask 22 the date dial selector is rotatable with respect to the hour dial indicator but is movable only with the mask 22. As shown in FIGURE 2 a view arrow 32 and a sun arrow 58 one hundred and eighty degrees apart are provided on the date dial selector. As previously stated the view arrow 32 initially indicates midnight on the date selected and subsequently is employed to indicate view selected in conjunction with the hour dial indicator for any time on the date originally selected. The sun arrow 58 initially indicates noon on the date selected and subsequently may be employed to indicate the general direction of the sun in conjunction with the hour dial indicator for any time on the date originally selected.

A meridian indicator 60 is provided as shown in FIGURE 1 to aid in the locating of particular celestial bodies or constellations thereof. The reference meridian 60 is attached between the highest and the lowest points 62 and 64 of the open edge of the mask 22. A fine wire or suitable substitute covered with phosphorous plastic material may be used to provide the meridian reference line.

Also as shown in FIGURE 1 an annular planet pathway wire 28 may be attached to the celestial sphere 15 by means of wire projections 66 which may be inserted within recesses 67 in flanges 34 and 36 which are clamped together in the groove 38 in the date ring if desired or otherwise suitably secured to the inner surface of sphere 15. Three wire projections 66 are provided on planet pathway wire 28 to insure proper alignment of the wire 28 on assembly and prevent a one hundred eighty degree displacement thereof. The projections 66 also are useful to align the sphere halves in assembly since if the sphere halves are not aligned the projections 66 will not be properly gripped thereby. Means such as an index line may be provided on the date ring 16 and one half of the sphere 15 to align the date ring in assembly. The planet pathway wire is positioned on the side of the ecliptic reference line 68 shown on the celestial sphere 15 toward the opening 20 so that planets 30 positioned on the planet pathway wire when projected on the inner surface of sphere 15 on viewing them from the opening 20 will appear to be positioned on the ecliptic reference line.

Planets 30 may be positioned on the planetary pathway wire as shown in FIGURE 1 and are of the construction shown in FIGURES 9, 9-A and 9-B. The planet 30 shown in FIGURE 9 is a spherical member provided with a clip 70 which may be of plastic or metal for securing it to the wire 28 in any desired location. The clip 70 is attached to the planet 30 by means of a suitable adhesive or other convenient means such as solder and is a nonrotatable member which may be made visible with a phosphorescent coating or by other convenient means for representation of all planets except Venus and Mercury. A construction for the phasing planets such as Venus and Mercury is shown in FIGURE 9-A wherein the planet is attached to the clip 70 by means of a rivet 72 extending axially therethrough and is made visible over only half of its surface. The planet 30 is rotatable about the rivet 72 in construction 9-A. FIGURE 9-B indicates a construction wherein the rivet 72 has an intermediate portion 73 between the spherical member 30 and clip 70 so that the spherical member when positioned on the wire 28 may be both rotated and positioned angularly with respect thereof. The moon may be represented by the construction shown in FIGURE 9-B painted black on one side and phosphorous on the other similar to the phasing planet construction previously mentioned to give an indication of only the visible portion thereof in use. The sun which apparently has the same relative size as the moon may be represented by a member such as that shown at 9 or a flat disc either of which would be entirely phosphorescent. The planets must of course be manually positioned on the planet pathway wire for a given date.

In operation of the star scope 10 as previously indicated, a specific date and time at which it is desired to view the locations of celestial bodies is selected. The date dial selector is then rotated with respect to the date ring until the sun arrow points to the date selected. The hour dial indicator is then rotated in relation to the date dial selector until the twelve midnight indication on the hour dial indicator aligns with the view arrow 32 on the date dial selector as indicated in FIGURE 2. On turning of the date dial selector 24 the mask 22 rotates therewith as previously indicated. With the view arrow 32 on the date dial selector in alignment with the twelve midnight indication on the hour dial indicator, and the selected date on the date ring in alignment with sun arrow 58 on the date dial selector, the mask will allow the celestial bodies which are visible at midnight on the selected day to be visible within the star scope when the inner surface of the celestial sphere 15 is viewed from the opening 20. The hour dial indicator may then be held stationary with respect to the celestial sphere while the date dial selector and the mask are rotated relative thereto until the view arrow 32 points to the time indication on the hour dial indicator at which it is desired to view the celestial bodies. The view within the celestial sphere will then be the desired representation of the celestial bodies on the selected day of the selected time.

It will be understood that while a preferred method of operation of the star scope of the invention has been described that other methods are possible and are intended to be included within the scope of the invention. For example direct dialing by means of changing the date ring 16 in FIGURE 2, one hundred and eighty degrees and setting the selected hour indication adjacent the selected date indication in the manner in which modification 10c of applicant's invention is operated is possible when adjacent dialing of hour to date is desired by the user.

The reason for dialing as previously discussed is to bring all of the various factors involved into play at first for the educational advantages so provided. Once these various factors have been visualized and their contributing effect thoroughly understood, then it becomes increasingly apparent that direct dialing is much easier by setting the midnight indication on the hour dial indicator 26 directly adjacent to the view arrow 32. Built in friction with care in handling would guarantee the simultaneous movement of both dials in alignment and the most direct dialing possible can be thus accomplished by merely changing the date dial 16 by one hundred eighty degrees on the modification where it is necessary to do so.

Figure 3:
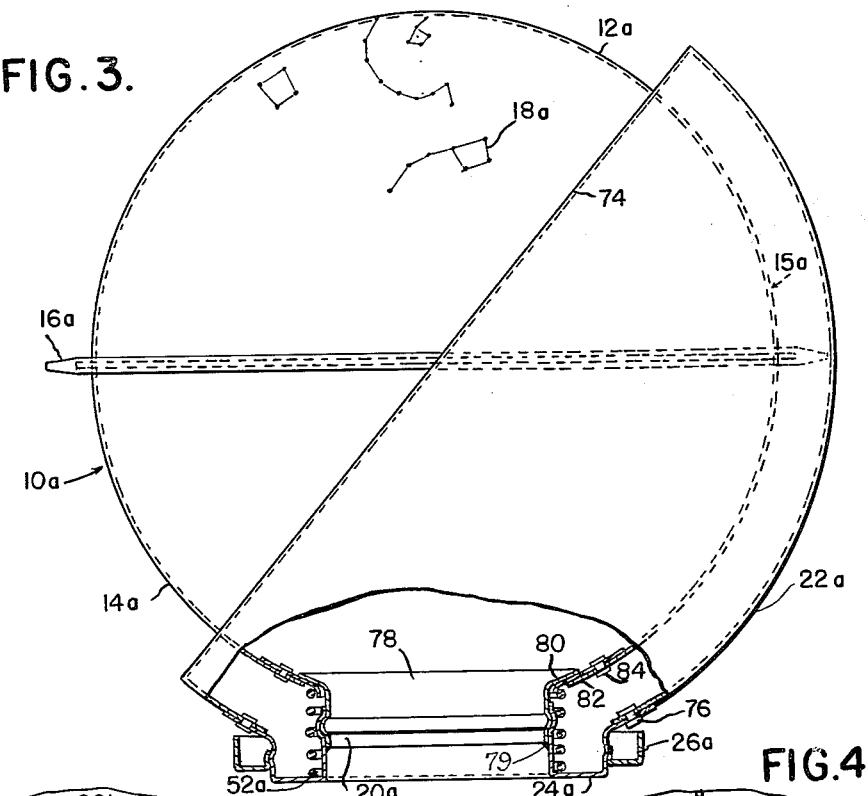
FIGURE 3 is an elevation view partly broken away of a modification of the star scope of the invention having the mask located exteriorly of the celestial sphere.

A modification 10a of the star scope 10 is illustrated in FIGURE 3. In the modified star scope the mask 22a is positioned on the exterior of the celestial sphere 15a. A light shield ring 74 is therefore provided between the open edge of the mask 22a and the celestial sphere 15a to prevent light from entering between the mask and the celestial sphere and passing through the openings in the sphere 15a representing celestial bodies on the celestial sphere which are below the particular horizon for the latitude which the mask 22a has been designed. It will be noted that a portion of the light shield ring has been deleted in the immediate area of the date ring 16a to provide for rotation of the mask 22a without interference with the date ring 16a.

The placing of the mask 22a on the exterior of the celestial sphere 15a necessitates a slight change in the mounting of the mask 22a in the opening 20a. As shown in FIGURE 3 the date dial selector 24a is rigidly connected with the mask 22a by convenient means such as rivets 76 and is secured to an annular member 78, which has a flange 80 that is free to rotate on ring 82 secured to the celestial sphere 15a by means of rivets 84, by means of mating annular grooves in the member 78 and the date dial selector 24a and a solder connection 79 between member 78 and date dial selector 24a as shown. Date dial selector 24a with the hour dial indicator 26a attached thereto as previously described and the mask 22a are resiliently supported in the position shown with respect to the celestial sphere 15a by means of the compression spring 52a.

The operation of the modified star scope 10a as illustrated in FIGURE 3 is entirely analogous to that of the star scope illustrated in FIGURES 1 and 2 and the indications on the date dial selector 24a, the hour dial indicator 26a and the date ring 16a are similar to those on like members of the star scope 10. However with only one side of the date ring exposed due to the placing of the mask 22a on the exterior of the celestial sphere 15a the modification 10a requires that the date ring be turned one hundred eighty degrees and direct reference with the view arrow 32a be used for location of celestial bodies at midnight on that date. Hour dial indicator alignment and subsequent date dial adjustment will then provide specific indications of the celestial body positions for any hour on that date.

A modification 10b of the star scope 10 of the invention is illustrated in FIGURES 4 and 4–A. The modification 10b is similar in operation and construction to the device illustrated in FIGURE 1 with the exception of the fact that all of the celestial bodies which are visible from a selected latitude have been located on a single member 12b of the star scope 10b. Also the mask 22b has been shaped accordingly so that a viewer positioned at the opening 20b will be permitted to see only those celestial bodies which will be visible to him on inspection of the sky at the particular latitude for which the mask 22b has been prepared at a selected date and time. Thus it is possible for a viewer to see substantially the same celestial bodies for the same setting of the date ring, hour dial indicator and date dial selector of the star scopes 10 and 10b, the only difference being that the location of the celestial bodies will be slightly distorted in the star scope 10b but the viewer will not have to peer sideways at such a large angle when viewing the celestial bodies on the interior surface of the celestial sphere 15b of the star scope 10b as would be necessary in the star scope shown in FIGURE 1. Also it will be noted that the date ring 16b of the star scope 10b does not connect the halves 12b and 14b thereof on the equator 87 with reference to the star positions as before. The means for adjustably mounting representations of the planets is the same as in FIGURE 1. As shown, planets 30b are mounted on pathway wire 28b supported on wire projections 66b.

Modification 10b most nearly represents the effect of a view actually looking up at the sky. This more natural apparition is followed in the design of the most expensive planetariums. In the latter the horizon is placed above the point of view of the observer where the advantages of effect far outweigh the slight disadvantage of minor distortion introduced.

FIGURES 5, 6 and 7 illustrate a modification 10c of the star scope 10 wherein openings 18c are provided in a flat date dial selector and star disc 88 in the position in which the celestial bodies are normally found as shown best in FIGURE 7. An hour dial indicator and horizon control 90 best shown in FIGURE 6 is provided in conjunction with the date dial selector and star disc to permit viewing of only that portion of the date dial selector and star disc which has openings therein which represent celestial bodies that would be visible to a viewer located at the latitude for which the mask was designed on a particular date at a specific time. It will be readily appreciated that the date dial selector and star disc 88 and the hour dial indicator and horizon control 90 may also be semi-hemispherical in shape having flat peripheral portions for date and hour indications as will be more apparent as the description proceeds. Further the hour dial indicator and horizon control 90 could be rotatable instead of fixed, while the date dial selector and star disc 88 could be fixed instead of rotatable. In this alternate arrangement positions of the discs could be reversed to retain the construction features as in FIGURE 5–A.

The date dial selector and star disc 88 in modification 10c of the star scope is viewed through the funnel shaped member 92 extending between an annular sight ring 94 attached to the small end thereof by convenient means such as rivets 96 and the annular flange 98 attached to the other end thereof by similar means such as rivets 100.

The hour dial indicator and horizon control 90 is fixedly attached to a flange 98 as shown by convenient means such as rivets 102 spaced circumferentially therearound. Annular ring 104 is provided around the outer circumference of the hour dial indicator and horizon control and may be attached to the annular ring 98 by means of the rivets 102 which secure the hour circle and horizon control 90 to the annular flange 98. The date dial selector and star disc is provided with an annular metal reinforcing member 106 around the outer circumference thereof as shown and an annular bracket 108 having a return lip 110 thereon adapted to fit over the member 104 on the hour dial indicator and horizon control 90 for rotation therearound. Both the reinforcing member 106 and the bracket 108 may be secured to the date dial selector and star disc 88 by convenient means such as rivets 112.

The date dial selector and star disc 88 as shown in FIGURE 7 is provided with date indications around the periphery thereof similar to those of the date ring 16 on the star scope 10. The date indications on the date dial selector and star disc are on the side toward the funnel shaped member 92 in the assembled star scope as shown in FIGURE 5. As shown in FIGURE 6 the hour dial indicator and horizon control is provided with hour indications around the circumference thereof which are also on the side toward the funnel shaped member 92 in the assembled star scope 10c. It will also be noted that the sighting ring 94 has the major compass points east, west, south and north indicated thereon by the letters E, W, S and N respectively. It will be noted that the date, hour and compass point indications are each visible to a viewer looking at the exterior of star scope 10c from the narrow end toward the wide end thereof.

In operation of the star scope 10c it is again necessary to select a particular date and time at which it is desired to view the celestial bodies which will be visible at a particular latitude. The date dial selector and star disc 88 is then rotated with respect to the fixed hour dial indicator and horizon control 90 until the time selected is immediately opposite the date selected as read around the circumference of the members 88 and 90. The openings 18c in the date dial selector and star disc 88 which are not covered by the hour dial indicator and horizon control 90, which will be included within the eliptical opening 114 which defines the horizon of a viewer at the latitude for which the horizon control has been designed, will then be visible to a viewer peering through the opening 20c in the sight ring 94. The direction from which the viewer will appear to be looking at the celestial bodies will be determined from the directional indications N, W, S and E on the sight ring as seen in FIGURE 5–B. The indication of the direction in which the viewer is looking should be held below the line of sight, that is down when looking into sight ring 94.

Thus applicant has provided the means by which the celestial bodies which would be visible to a viewer at a particular latitude may be viewed as they would appear at any particular date and time without the necessity of providing a special inclosure for the viewer and which may be used in a lighted room or out of doors in daylight.

It will be understood that many modifications of applicant's device such as placing the date ring on the ecliptic and dividing the sphere 15 on this reference line or providing means such as the planetary wire 28 for mounting man made satellites on the interior of the sphere 15 are possible. It is applicant's intention to include all such modifications as would suggest themselves to persons skilled in the planetarium art within the scope of his invention as particularly defined in the appended claims.

What I claim as my invention is:

1. A star scope for the visual representation of celestial bodies, comprising an enclosure, visible indicia of celestial bodies in said enclosure located with respect to each other in the relative position of celestial bodies when viewed from the earth, a sight opening in said enclosure opposite said indicia which is small relative to the size of the enclosure to permit viewing of the interior of the enclosure, and an opaque mask secured in said sight opening selectively positionable with respect to said enclosure for permitting the viewing from said opposite opening of only the indicia representative of the celestial bodies viewable from a specific latitude at a particular time on a specific date.

2. A star scope for the visual representation of celestial bodies, comprising an enclosure, visible indicia of celestial bodies in said enclosure located with respect to each other in the relative position of celestial bodies when viewed from the earth, a sight opening in said enclosure opposite said indicia which is small relative to the size of the enclosure to permit viewing of the interior of the enclosure, a mask secured in said sight opening selectively positionable with respect to said enclosure to permit the viewing from said opposite opening of only the indicia representative of the celestial bodies viewable from a specific latitude at a particular time on a specific date, and means for adjustably mounting representations of planets around the interior of said enclosure.

3. A star scope for the visual representation of celestial bodies, comprising an enclosure, visible indicia of celestial bodies in said enclosure located with respect to each other in the relative position of celestial bodies when viewed from the earth, a sight opening in said enclosure opposite said indicia which is small relative to the size of the enclosure to permit viewing of the interior of the enclosure, an opaque mask secured in said sight opening selectively positionable with respect to said enclosure for permitting the viewing from said opposite opening of only the indicia representative of the celestial bodies viewable from a specific latitude at a particular time on a specific date, and a reference meridian line positioned within said enclosure for movement with said mask to aid in the locating of the indicia representative of particular celestial bodies when viewing the interior of said enclosure.

4. A planetarium for presenting a visual representation of celestial bodies to an individual in a lighted area, comprising a spherical enclosure representative of a celestial sphere, openings in said sphere located with respect to each other in the relative position of celestial bodies projected on a celestial sphere as viewed from the earth, a sight opening in said sphere to permit viewing of the interior thereof, and an opaque hemispherical mask within said sphere supported in said sight opening and rotatable about a diameter of said sphere passing through said sight opening, into selected positions between said first mentioned openings and said sight opening to permit the viewing from said sight opening of only those first mentioned openings representative of the celestial bodies viewable at a particular time on a specific date.

5. A planetarium for presenting a visual representation of celestial bodies to an individual in a lighted area, comprising a spherical enclosure representative of a celestial sphere including a pair of hemispheres secured together by means of an annular ring having the dates of the year indicated therearound, openings in said sphere located with respect to each other in the relative position of celestial bodies projected on a celestial sphere as viewed from the earth, a sight opening in said sphere to permit viewing of the interior thereof, an opaque hemispherical mask within said sphere supported in said sight opening and rotatable about a diameter of said sphere passing through said sight opening, into selected positions between said first mentioned openings and said sight opening to permit the viewing from said sight opening of only those first mentioned openings representative of the celestial bodies viewable at a particular time on a specific date, and a date dial selector secured to said mask around the periphery of said sight opening for rotation therewith with respect to said sphere, said date dial selector having hour indications around the periphery thereof for alignment with a particular date indication on said date ring whereby the mask may be positioned to allow viewing of a selected portion of said sphere.

6. A planetarium for presenting a visual representation of celestial bodies to an individual in a lighted area, comprising a spherical enclosure representative of a celestial sphere including a pair of hemispheres secured together by means of an annular ring having the dates of the year indicated therearound, openings in said sphere located with respect to each other in the relative position of celestial bodies projected on a celestial sphere as viewed from the earth, a sight opening in said sphere to permit viewing of the interior thereof, an opaque hemispherical mask within said sphere supported in said sight opening and rotatable about a diameter of said sphere passing through said sight opening, into selected positions between said first mentioned openings and said sight opening to permit the viewing from said sight opening of only those first mentioned openings representative of the celestial bodies viewable at a particular time on a specific date, a date dial selector secured to said mask around the periphery of said sight opening for rotation therewith with respect to said sphere, said date dial selector having hour indications around the periphery thereof for alignment with a particular date indication on said date ring whereby the mask may be positioned to allow viewing of a selected portion of said sphere, and an annular hour dial indicator rotatably secured to said date dial selector around the periphery of said sight opening and having oppositely directed and located indicators thereon representative of noon and midnight for use in conjunction with said date dial selector and date ring for positioning said mask to allow viewing of only those first mentioned openings representative of the celestial bodies viewable at a particular hour on a specific date.

7. The structure as claimed in claim 6 including a meridian line secured between the highest and lowest points of the open side of said hemispherical mask for rotation with said mask with respect to said sphere to aid in the locating of openings representative of particular celestial bodies when viewing the interior of said enclosure.

8. The structure as claimed in claim 6 including an annular member secured between said sphere and mask in spaced relation to said sphere and so located with respect thereto that a projection thereof on said sphere from said sight opening lies on the ecliptic of said celestial sphere, and representations of planets adjustably mounted on said annular member.

9. The structure as claimed in claim 8 including a planet representation adjustably positioned on the annular member, rotatable about the annular member, and rotatable about its own axis.

10. A planetarium for presenting a visual representation of celestial bodies to an individual in a lighted area, comprising a spherical enclosure representative of a celestial sphere, openings in said sphere located with respect to each other in the relative position of celestial bodies projected on a celestial sphere as viewed from the earth, a sight opening in said sphere to permit viewing of the interior thereof, and an opaque hemispherical mask surrounding a portion of said sphere in spaced relation thereto, said mask being supported around the periphery of said sight opening and being rotatable about a diameter of said sphere passing through said sight opening, into selected shielding positions over said first mentioned openings to mask from view through said sight opening those first mentioned openings representative of the celestial bodies not viewable at a particular time on a specific date.

11. A planetarium for presenting a visual representation of celestial bodies to an individual in a lighted area, comprising a spherical enclosure representative of a celestial sphere, openings in said sphere located with respect to each other in the relative position of celestial bodies projected on a celestial sphere as viewed from the earth, a sight opening in said sphere to permit viewing of the interior thereof, an opaque hemispherical mask surrounding a portion of said sphere in spaced relation thereto, said mask being supported around the periphery of said sight opening and being rotatable about a diameter of said sphere passing through said sight opening, into selected shielding positions over said first mentioned openings to mask from view through said sight opening those first mentioned openings representative of the celestial bodies not viewable at a particular time on a specific date, and a light shield positioned between said mask and sphere at the open edge of said mask to prevent light from entering the space between said mask and sphere.

12. A planetarium for presenting a visual representation of celestial bodies to an individual in a lighted area, comprising an enclosure one half of which is a spherical segment having arranged thereon openings in the relative location of the celestial bodies visible from a selected latitude on the earth's surface, and a sight opening in the other half of said enclosure which is small relative to the size of the enclosure to permit viewing of the inner surface of said spherical segment with a minimum of distractions.

13. A planetarium for presenting a visual representation of celestial bodies to an individual in a lighted area, comprising an enclosure one half of which is a spherical segment having arranged thereon openings in the relative location of the celestial bodies visible from a selected latitude on the earth's surface, a sight opening in the other half of said enclosure to permit viewing of the inner surface of said spherical segment, and a mask within said enclosure in the general shape of a truncated cone the axis of which extends at an oblique angle to a diameter of said spherical segment passing through said sight opening, said mask being supported in said sight opening and being rotatable about the diameter of said spherical segment passing through said sight opening, into selected positions between said first mentioned openings and said sight opening to permit the viewing from said sight opening of only those first mentioned openings representative of the celestial bodies viewable at a particular time on a specific date.

14. A planetarium for presenting a visual representation of celestial bodies to an individual in a lighted area, comprising an enclosure representative of a celestial sphere including a pair of spherical segments, secured together in opposing relation about the larger diameter thereof by means of an annular ring having the dates of the year indicated therearound, openings in one of said spherical segments located with respect to each other in the relative position of celestial bodies projected on a celestial sphere as viewed from the earth, a sight opening in the other of said spherical segments to permit viewing of the interior of said enclosure, a conical mask within said enclosure the axis of which extends at an oblique angle to an axis of said enclosure through said sight opening, said mask being supported in said sight opening and being rotatable about the axis of said enclosure passing through said sight opening, into selected positions between said first mentioned openings and said sight opening to permit the viewing from said sight opening of only those first mentioned openings representative of the celestial bodies viewable at a particular time on a specific date, and a date dial selector secured to said mask around the periphery of said sight opening for rotation therewith with respect to said enclosure, said date dial selector having hour indications around the periphery thereof for alignment with a particular date indication on said date ring whereby the mask may be positioned to allow viewing of a selected portion of said enclosure.

15. A planetarium for presenting a visual representation of celestial bodies to an individual in a lighted area, comprising an enclosure representative of a celestial sphere including a pair of spherical segments, secured together in opposing relation about the larger diameter thereof by means of an annular ring having the dates of the year indicated therearound, openings in one of said spherical segments located with respect to each other in the relative position of celestial bodies projected on a celestial sphere as viewed from the earth, a sight opening in the other of said spherical segments to permit viewing of the interior of said enclosure, a conical mask within said enclosure the axis of which extends at an oblique angle to an axis of said enclosure through said sight opening, said mask being supported in said sight opening and being rotatable about the axis of said enclosure passing through said sight opening, into selected positions between said first mentioned openings and said sight opening to permit the viewing from said sight opening of only those first mentioned openings representative of the celestial bodies viewable at a particular time on a specific date, and a date dial selector secured to said mask around the periphery of said sight opening for rotation therewith with respect to said enclosure, said date dial selector having hour indications around the periphery thereof for alignment with a particular date indication on said date ring whereby the mask may be positioned to allow viewing of a selected portion of said enclosure, and an annular hour dial indicator rotatably secured to said date dial selector around the periphery of said sight opening and having oppositely directed and located indicators thereon representative of noon and midnight for use in conjunction with said date dial selector and date ring for positioning said mask to allow viewing of only those first mentioned openings representative of the celestial bodies viewable at a particular hour on a specific date.

16. The structure as claimed in claim 15 including a meridian line secured across the open base of said conical mask for rotation with said mask with respect to said enclosure to aid in the locating of openings representative of particular celestial bodies when viewing the interior of said enclosure.

17. The structure as claimed in claim 15 including an annular member secured between said enclosure and mask in spaced relation to said enclosure and so located with respect thereto that a projection thereof on said one spherical segment from said sight opening lies on a line representing the ecliptic of a celestial sphere, and representations of planets adjustably mounted on said annular member.

18. The structure as claimed in claim 17 wherein the planet representations adjustably positioned on the annular member are rotatable about the annular member, and rotatable about their own axis.

19. A star scope for the visual representation of celestial bodies, comprising an enclosure, visible indicia of celestial bodies in said enclosure located with respect to each other in the relative position of celestial bodies when viewed from the earth, a sight opening in said enclosure opposite said indicia to permit viewing of the interior of the enclosure, and an opaque mask located between the sight opening and visible indicia selectively positionable with respect to said enclosure for permitting the viewing from said opposite opening of only the indicia representative of the celestial bodies viewable from a specific latitude at a particular time on a specific date.

20. A star scope for the visual representation of celestial bodies, comprising an enclosure, visible indicia of celestial bodies in said enclosure located with respect to each other in the relative position of celestial bodies when viewed from the earth, a sight opening in said enclosure opposite said indicia which is small relative to the size of the enclosure to permit viewing of the interior of the enclosure, and a mask secured in said sight opening selectively positionable with respect to said enclosure and in substantial spaced relation thereto to permit the viewing from said opposite opening of only the indicia representative of the celestial bodies viewable from a specific latitude at a particular time on a specific date.

21. A planetarium for presenting a visual representation of celestial bodies to an individual in a lighted area, comprising an enclosure having arranged thereon openings in the relative location of the celestial bodies visible from a selected latitude on the earth's surface, a sight opening in said enclosure to permit viewing of the inner surface thereof, and a mask within said enclosure in the general shape of a truncated cone, the axis of which extends at an oblique angle to an axis of said enclosure passing through said sight opening, said mask being supported in said sight opening and being rotatable about the axis of the enclosure passing through said sight opening, into selected positions between said first mentioned openings and said sight opening to permit the viewing from said sight opening of only those first mentioned openings representative of the celestial bodies visible at a particular time on a specific date.

22. A planetarium for presenting a visual representation of celestial bodies to an individual in a lighted area, comprising an enclosure one-half of which is a spherical segment having arranged thereon openings in the relative location of the celestial bodies visible from a selected latitude on the earth's surface, a sight opening in the other half of said enclosure to permit viewing of the inner surface of said spherical segment, and a mask within said enclosure having an axis which extends at an oblique angle to a diameter of said spherical segment passing through said sight opening, said mask being upported in said sight opening and being rotatable about the diameter of said spherical segment passing through said sight opening, into selected positions between said first mentioned openings and said sight opening to permit the viewing from said sight opening of only those first mentioned openings representative of the celestial bodies viewable at a particular time on a specific date.

23. A planetarium for presenting a visual representation of celestial bodies to an individual in a lighted area, comprising an enclosure one half of which is a spherical segment having arranged thereon openings in the relative location of the celestial bodies visible from a selected latitude on the earth's surface, a sight opening in the other half of said enclosure to permit viewing of the inner surface of said spherical segment, and a mask within said enclosure in the general shape of a truncated cone, the axis of which extends at an oblique angle to a diameter of said spherical segment passing through said sight opening, said mask being rotatable about the diameter of said spherical segment passing through said sight opening, into selected positions between said first mentioned openings and said sight opening to permit the viewing from said sight opening of only those first mentioned openings representative of the celestial bodies viewable at a particular time on a specific date.

24. A planetarium for presenting a visual representation of celestial bodies to an individual in a lighted area, comprising an enclosure one half of which is a spherical segment having arranged thereon openings in the relative location of the celestial bodies visible from a selected latitude on the earth's surface, a sight opening in the other half of said enclosure to permit viewing of the inner surface of said spherical segment, and a mask in the general shape of a truncated cone, the axis of which extends at an oblique angle to a direction of said spherical segment passing through said sight opening, said mask being supported in said sight opening and being rotatable about the diameter of said spherical segment passing through said sight opening, into selected positions relative to said first mentioned openings and said sight opening to permit the viewing from said sight opening of only those first mentioned openings representative of the celestial bodies viewable at a particular time on a specific date.

25. A planetarium for presenting a visual representation of celestial bodies, comprising an enclosure having arranged thereon openings in the relative location of the celestial bodies visible from a selected latitude on the earth's surface, a sight opening in said enclosure to permit viewing of the inner surface thereof, and a mask having an axis extending at an oblique angle to an axis of said enclosure passing through said sight opening, said mask being rotatable about the axis of said enclosure passing through said sight opening, into selected positions relative to said first mentioned openings and said sight opening to permit the viewing from said sight opening of only those first openings representative of the celestial bodies viewable at a particular time on a specific date.

References Cited in the file of this patent
UNITED STATES PATENTS

| | | |
|---|---|---|
| 279,439 | Rupert | June 12, 1883 |
| 1,928,025 | McEwan | Sept. 26, 1933 |
| 2,263,582 | Isely | Nov. 25, 1941 |
| 2,349,515 | Oberst | May 23, 1944 |
| 2,588,472 | Beeson | Mar. 11, 1952 |